C. B. Hogg,
Horse Collar.

No. 87,257. Patented Feb. 23, 1869.

Witnesses.
J. Snowden Bell,
Levi Dillenberg.

Inventor.
Charles B. Hogg,
By his attorney
J. C. Robbins.

United States Patent Office.

CHARLES B. HOGG, OF BOSTON, MASSACHUSETTS, ASSIGNOR TO AMERICAN HORSE-COLLAR COMPANY, OF SAME PLACE.

Letters Patent No. 87,257, dated February 23, 1869.

IMPROVED SWEAT-SHIELD FOR HORSE-COLLARS.

The Schedule referred to in these Letters Patent and making part of the same.

*To all whom it may concern:*

Be it known that I, CHARLES B. HOGG, of Boston, in the county of Suffolk, and State of Massachusetts, have invented a new article of manufacture in the shape of an Impervious Sweat-Shield for Horse-Collars; and I do hereby declare that the following is a full and exact description thereof, reference being had to the accompanying drawings, which form a portion of this specification—

Figure 1:
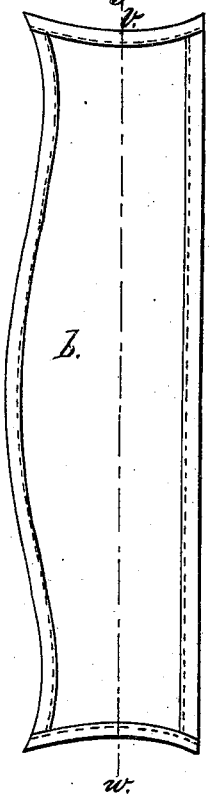

Figure 1 being a side view of said invention, and

Figure 2:
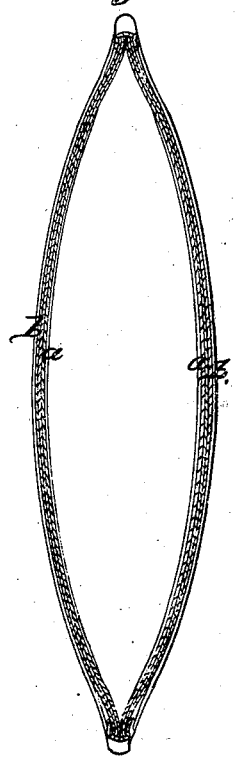

Figure 2, a section in the line $v\ w$ of fig. 1.

That description of horse-collars, whose bearing-surfaces are composed of leather, serge, kersey, ticking, canvas, or other pervious material, when subjected to practical use, in hot weather, soon become saturated with animal exudations, which exudations soon destroy the elasticity of the stuffing of the bodies of the collars, and render the covering of the same greasy and dirty.

The action of such collars upon the skin of an animal, is just what might be expected, namely, they produce irritation and ugly sores, which not unfrequently render horses and mules unfit for service during an entire season.

The object of my invention is to remedy these imperfections in horse-collars, and this I do by means of an inexpensive device, to be used in connection with said collars.

This device may be termed a sweat-shield, and is of such a shape that it may be placed within one of the old style of horse-collars, and when so placed, will entirely cover the bearing-surface thereof.

This sweat-shield is composed of a bearing-surface, $a$, of vulcanized rubber, which must be combined with some suitable strengthening, fibrous backing, and this, again, is usually protected by an outer cover, $b$, of leather, or of some other suitable material.

In the matter of shape and general proportions, the said sweat-shield should be made to fit the horse-collar with which it is to be used, and the edges thereof may be bound and stitched with plain or fancy-colored materials, to suit the taste of the maker or user.

Figure 3:
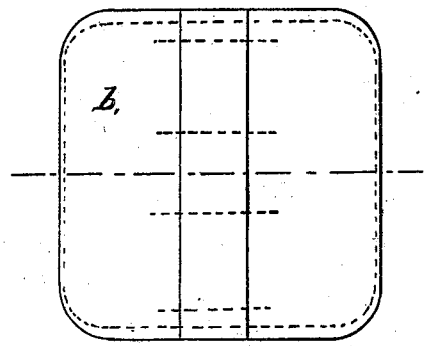

Figure 3 is a top view, and

Figure 4:
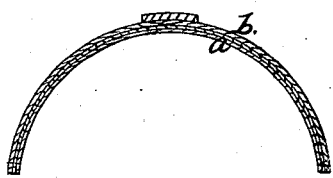

Figure 4, a section of a small sweat-shield, that may be placed upon the neck of an animal, in such a position as to support the weight of a horse-collar.

The said smaller sweat-shield also has a bearing-surface of vulcanized rubber, combined with a suitable backing and an outer covering.

It may sometimes be found expedient to use this last-described sweat-shield in conjunction with my said collar-shaped sweat-shield, and especially so with very large and heavy collars.

What I claim as my invention, and desire to secure by Letters Patent, as a new and useful manufacture, is—

A sweat-shield, for the bearing-surfaces of horse-collars, said sweat-shield being composed of an inner bearing-surface of vulcanized rubber, which is combined with a strengthening, fibrous backing, and protected by an outer covering of leather, or other suitable material, substantially as herein set forth.

The foregoing specification of my new and improved water-proof protecting-shield or covering, for the bearing-surfaces of horse-collars, signed and witnessed, this 19th day of January, 1869.

CHARLES B. HOGG.

Witnesses:
T. J. BRYANT,
JOHN B. FOLGER.